United States Patent
Brewer, Sr.

[11] Patent Number: 5,826,477
[45] Date of Patent: Oct. 27, 1998

[54] COMBINATION GUIDE AND SAWDUST REMOVER

[76] Inventor: Clarence R. Brewer, Sr., P.O. Box 150, Central City, Ky. 42330

[21] Appl. No.: 569,788

[22] Filed: Dec. 8, 1995

[51] Int. Cl.⁶ ............................................. B26D 3/08
[52] U.S. Cl. ........................... 83/168; 83/421; 83/446; 83/829
[58] Field of Search .................. 83/98, 820, 794, 83/871, 435.2, 436, 829, 446, 449, 420, 421, 168

[56] References Cited

U.S. PATENT DOCUMENTS

| | | | |
|---|---|---|---|
| 1,482,711 | 2/1924 | Sorenson | 83/871 |
| 2,685,311 | 8/1954 | Ferrari | 83/871 |
| 2,850,053 | 2/1958 | Voss | 83/829 |
| 3,452,734 | 7/1969 | Cleland et al. | 83/820 |
| 4,291,601 | 9/1981 | Guynup | 83/871 |
| 4,327,621 | 5/1982 | Voorhees et al. | 83/820 |
| 4,342,241 | 8/1982 | Eklund | 83/820 |
| 4,452,118 | 6/1984 | Muller | 83/446 |
| 5,301,579 | 4/1994 | Shiotani et al. | 83/168 |
| 5,485,772 | 1/1996 | Bastasch et al. | 83/449 |

*Primary Examiner*—Maurina Rachuba

[57] ABSTRACT

A means of automatically adjusting band saw blade guides according to the widths of the sawn material so as to minimize the unsupported length of a band saw blade combined with an improved means of removing material dust. The means of removing sawdust from the sawn material is also applicable to horizontal circular saw blades.

6 Claims, 4 Drawing Sheets

COMBINATION GUIDE AND SAWDUST REMOVER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention was devised to efficiently remove sawdust from wood and wood products, including boards, as they are sawed by a horizontal band saw blade or a horizontal circular saw blade. The present invention also improves the accuracy of a band saw cut as well as increases the life of a band saw blade while sawing a variety of wood widths. Sawdust residue on wood products, especially on boards used in pallets for the food and drug industries, is quite objectionable. Also, for example, in the furniture industry, the sawdust must be removed from wood products prior to painting or varnishing. There hasn't been an efficient way to remove all the sawdust residue from wood sawn with a horizontal band or a horizontal circular blade prior to the present invention. The present invention also results in a thinner kerf, which means less wood wastage, less sawdust generated, and a quieter process.

DESCRIPTION OF PRIOR ART

U.S. Pat. No. 1,850,272, by J. R. Shaw, Mar. 22, 1932 addresses the problem of removing sawdust from a bandsawed board by modifying the band saw to induce air through the saw cut. This approach did not achieve commercial success and is not used today. In the patent, Shaw writes: "No opportunity is provided for permitting the sawdust produced by such resawing action to be removed unless a separate operation is provided by which such opposed surfaces are subjected to a cleaning action, such as by a brush or other mechanical agency, or by a jet of fluid, preferably air . . . An auxiliary cleaning process, to be effective, involves a substantial amount of time and must be charged for by the producer . . . and such charge in many cases is sufficient to swing the balance against the use of such cleaned box shooks when considered from an economic viewpoint." That is still the practise today. While the present invention might seem obvious, the fact that no one has done it the way the present invention does, as a part of the sawing process, argues against obviousness. Shaw implies the separate operation required is a manual operation after the board is no longer in the sawing process.

SUMMARY OF THE INVENTION

The present invention is a method and means of removing sawdust from wood, such as a board, while being sawn with a horizontal band saw blade or a horizontal circular saw blade, by means of a jet of air focused directly behind a horizontal band saw blade or horizontal circular saw blade parallel to, and in the direction of blade teeth travel. A nozzle supplies the air, said nozzle held in the proper position by a fixture that automatically adjusts to the bandsawed board width, being urged against the bandsawed board by a spring. The fixture also serves as a blade guide which results in a band saw blade span of only the board width, as opposed to the typical twelve inch band saw blade span that is now common in the manufacture of pallet boards. This produces additional benefits, beyond precision placement of the nozzle, of providing for more precise location and support of the band saw blade which results in more precise bandsawing, longer life of the band saw blade, less sawdust generated, less wood wasted due to the thinner kerf, and less noise during the sawing process. A band saw blade that has only a board width of unsupported span, say, four to six inches, will have less vertical travel and vibration than a band saw blade with an unsupported span of twelve inches, as is common in the industry today. This means the band saw blade stays in a straighter line so it doesn't waste energy vibrating up and down, resulting in a wider kerf, which generates more saw dust and also is harder on band saw blade teeth, requiring more frequent sharpening which results in a shorter life. In this specification, the terminology band saw is used to describe a machine which is a saw consisting of an entire toothed steel band passing over two wheels. The entire toothed steel band which passes over two wheels is referred to as the band saw blade in this specification. The word bandsaw as used in this specification is a verb used meaning to cut with a band saw. A roller cam operated valve actuated by a cam on a shaft turns the air supply to the air discharge nozzle on or off as required during the sawing process.

BRIEF DESCRIPTION OF THE DRAWINGS

FIGS. 1, 1a and 1b show a view of a portion of a typical band saw as used to saw pallet boards with the present invention.

DESCRIPTION OF THE PREFERRED EMBODIMENTS

Figure 1:
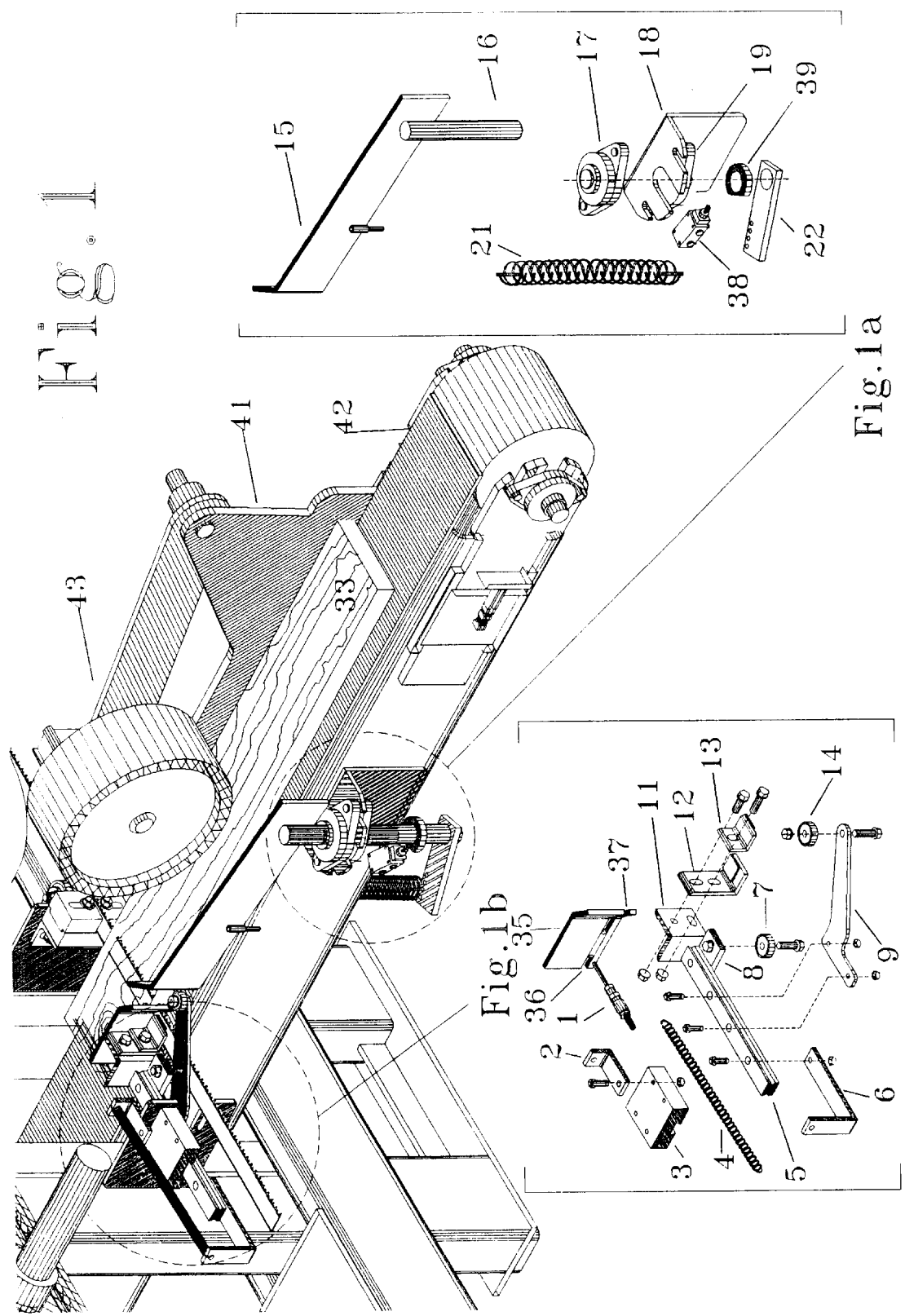
Figure 2:
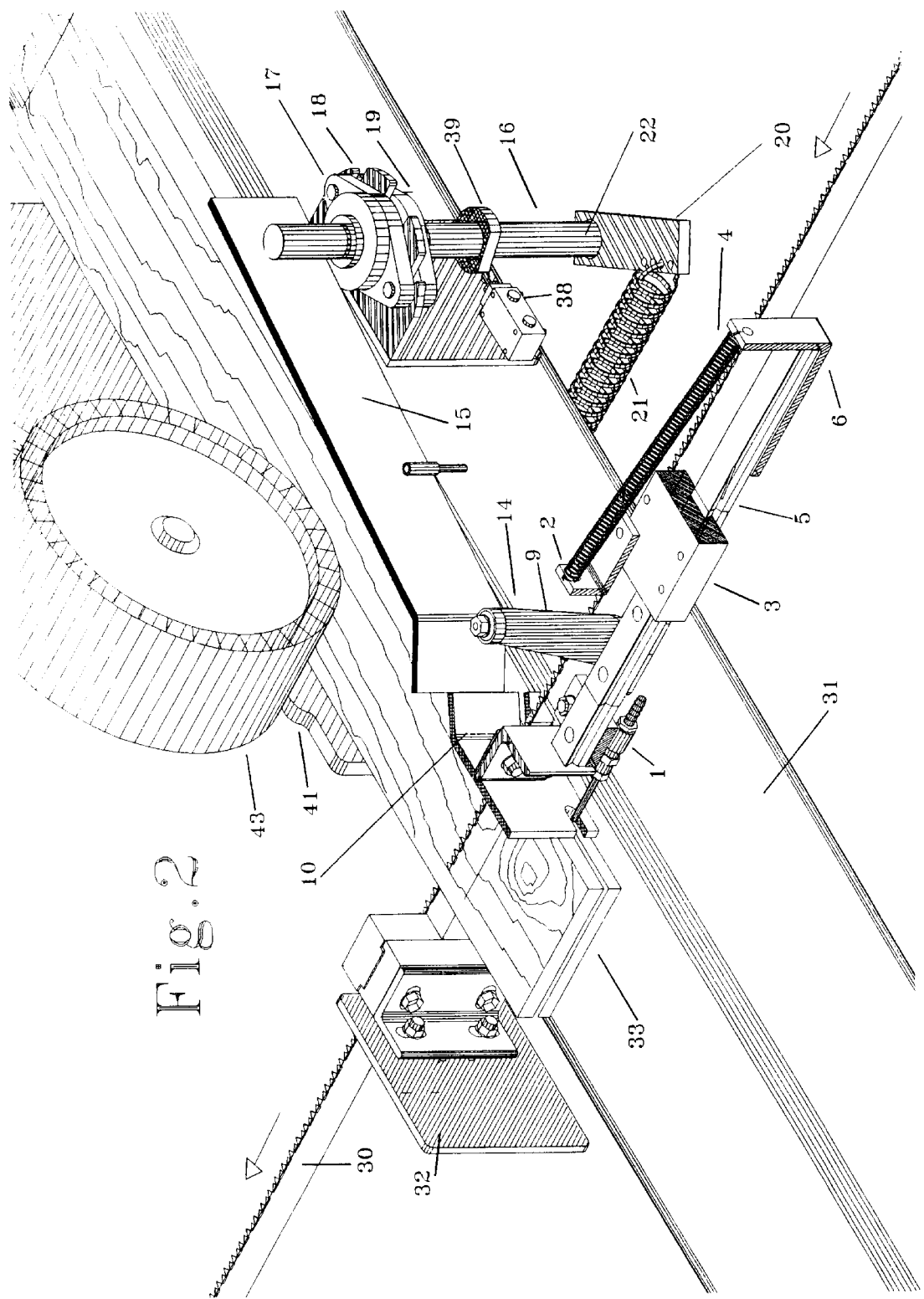
FIG. 2 shows a closer view of the present invention.

Starting with FIG. 2, a band saw frame 31 is shown with a board 33 being cut by a band saw blade 30. The board abutts a fence 41 which is common on typical band saws. There is a air discharge nozzle 1 which is mounted in a slide shoe assembly 10 which includes a slide 5 which slides in a mount 3 which is fixed in place. As shown in FIG. 1, the slide shoe assembly 10 includes a slide shoe 35, which includes a nozzle clearance 36 and a band clearance 37. The slide shoe assembly 10 also includes a small roller blade bearing 7, a mounting tab 8 upon which the small roller blade bearing 7 mounts, a mounting tab for blade guides 11, a lower blade guide 12 and an upper blade guide 13. The lower blade guide 12 and the upper blade guide 13 mount on the mounting tab for blade guides 11. Various bolts, as common to the state of the art are used to affix the various pieces together. The slide shoe assembly 10 is held against the board 33 with by a return spring 4 which is attached to a stationary spring mount 2 and to a moving spring mount 6 which is affixed to the slide 5. The slide shoe assembly 10 includes an arm 9 which supports a large roller bearing 14 which is also a part of the slide shoe assembly 10. The large roller bearing 14 rides on a width positioning arm 15 which is a part of a width positioning arm assembly 20. The width positioning arm assembly 20 consists of the width positioning arm 15, a plate 22, a spring 21, a support shaft 16, an upper bearing 17, a lower bearing 19, and a mounting tab 18 which is fixed in place. As the board 33 is fed into the band saw band 30, typically by a conveyor belt 42 in conjunction with a feed roller 43, the width positioning arm 15 which is attached to the support shaft 16, is held against the board 33 because of the tension from the spring 21 on the plate 22 which is transmitted through the support shaft 16 to the width positioning arm 15. The tension of the spring 21 is sufficient to keep the board 33 abutted against a fence 41 which serves as a reference surface. The width positioning arm 15 is bent into such a shape that the large roller bearing 14 rides on the width positioning arm 15, which in turn positions the slide shoe assembly 10 with respect to the board 33 which results in a precise positioning of the air discharge nozzle 1. This is a very important detail, as for optimum performance, the air discharge nozzle, in the preferred embodiment of the present invention, should be approximately one sixteenth of an inch from the board 33. Whatever the optimum distance, it needs to be held at that distance. Without the inherent self-adjustment of the slide shoe assembly 10 with respect to a standard fixed saw guide assembly 32, to accomodate the variety of board 33 widths, it would be necessary to allow for the widest board 33 that would be processed, which would result in an excessive air gap between the air discharge nozzle 1 and the narrowest board 33. The positioning of the lower blade guide 12 and the upper blade guide 13 on the slide shoe assembly is an important feature of the preferred embodiment of the present invention. The distance of the lower blade guide 12 and the upper blade guide 13 from the standard fixed saw guide assembly 32 is minimized. The present state of the art is to have a distance of approximately twelve inches between the band saw band guides, resulting in a twelve inches of unsupported band during the bandsawing process. The present invention reduces that span to the board 33 width, which is typically runs 3 to 8 inches in width for many pallet board widths. This results in less band vibration or flexing in the portion of the band saw band 30 engaged in cutting of the board 33. This results in a thinner kerf which means less sawdust is created from the sawing process. This also means less wear on the band saw band teeth, which means less noise, fewer sharpenings, and a longer band life. Noise and dust are hazards in sawmills, and the present invention reduces both.

Without the features being described herein, the distance of the air discharge nozzle 1 from the board 33 would have to be manually adjusted for the various nominal sizes, and then would not operate in a satisfactory manner for the variations within the nominal board 33 sizes. Within a nominal board 33 width, a ¾ inch variation in typical, while the air discharge nozzle needs to be approximately one sixteenth of an inch from the board 33 edge for optimal performance. On pallet boards, a variation in width of ¾ inch is not uncommon.

The support shaft 16 includes a cam 39 which operates a roller cam operated air supply valve 38, on or off, FIG. 2 shows the air valve 36 with the cam 39 installed so that the flat of the cam 39 is in contact with the air valve 39 when it is desired to provide air flow to the nozzle. If there was no board holding the width positioning arm 15 in the position shown, the support shaft 16 would rotate clockwise, rotating the cam, which would force the valve stem, (shown but not numbered), inward, which would shut off the air flow through the valve, and to the nozzle.

Figure 3:
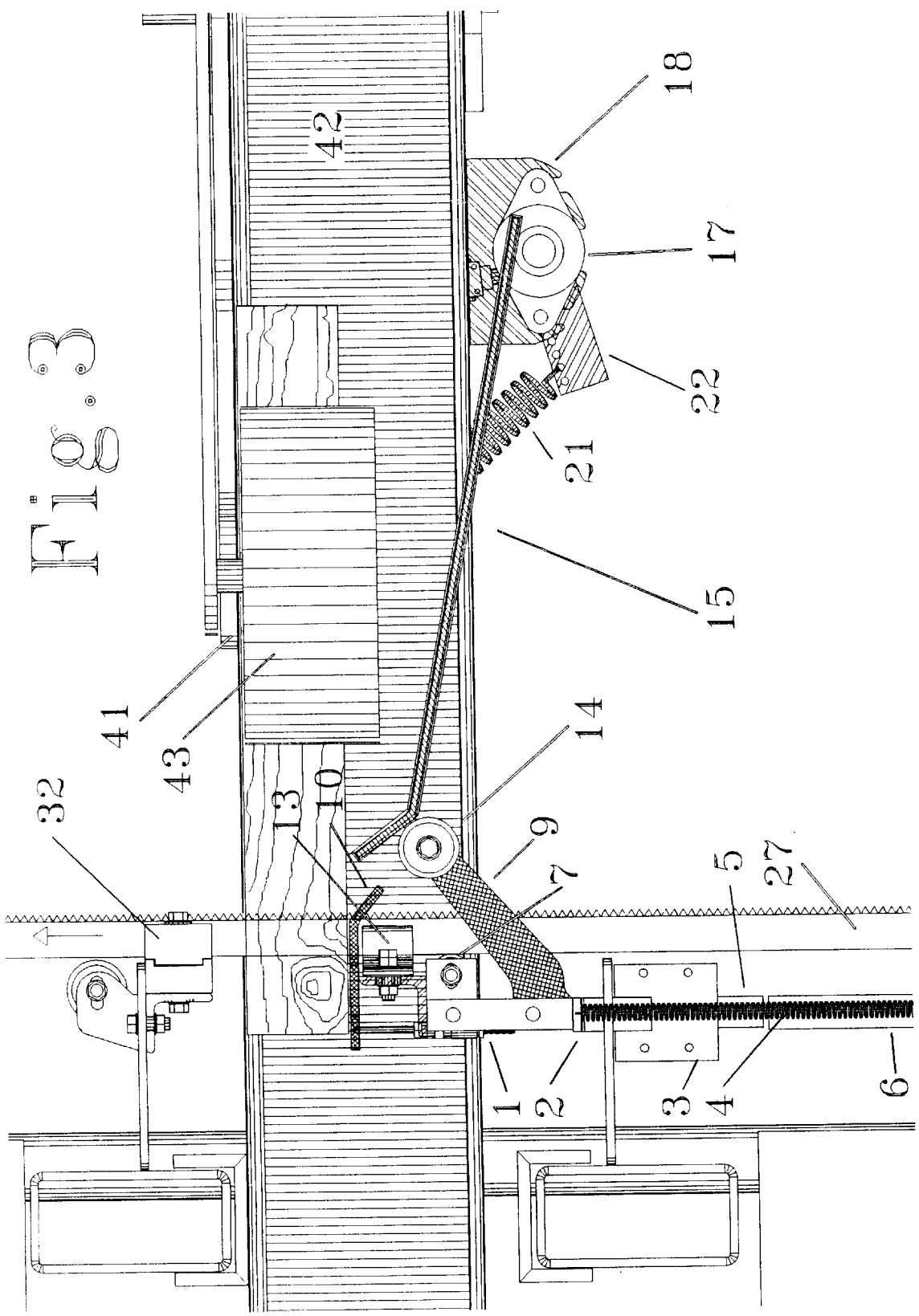
FIG. 3 shows a top view of the present invention.

The spring 21 attaches at one end to the plate 22 and to any convenient fixed place on the band saw frame 31 at the other end. In the preferred embodiment of the invention as shown in FIG. 2, the air discharge nozzle 1 is mounted as a part of the slide shoe assembly 10, with the direction of air flow through a cut in the board 33 by the band saw band, said direction of the air flow being in the same direction as the band saw band 30 travel as shown in FIG. 2. In the preferred embodiment of the present invention, as shown in FIGS. 1, 2, and 3, an auxiliary dust collector 34, as shown in FIG. 4, is not required as the sawdust generated by the bandsawing of the board 33 is collected by a conventional exhaust system common on conventional state of the art band saws, such as are manufactured by Brewco, Inc. of Central City, Ky.

Figure 4:
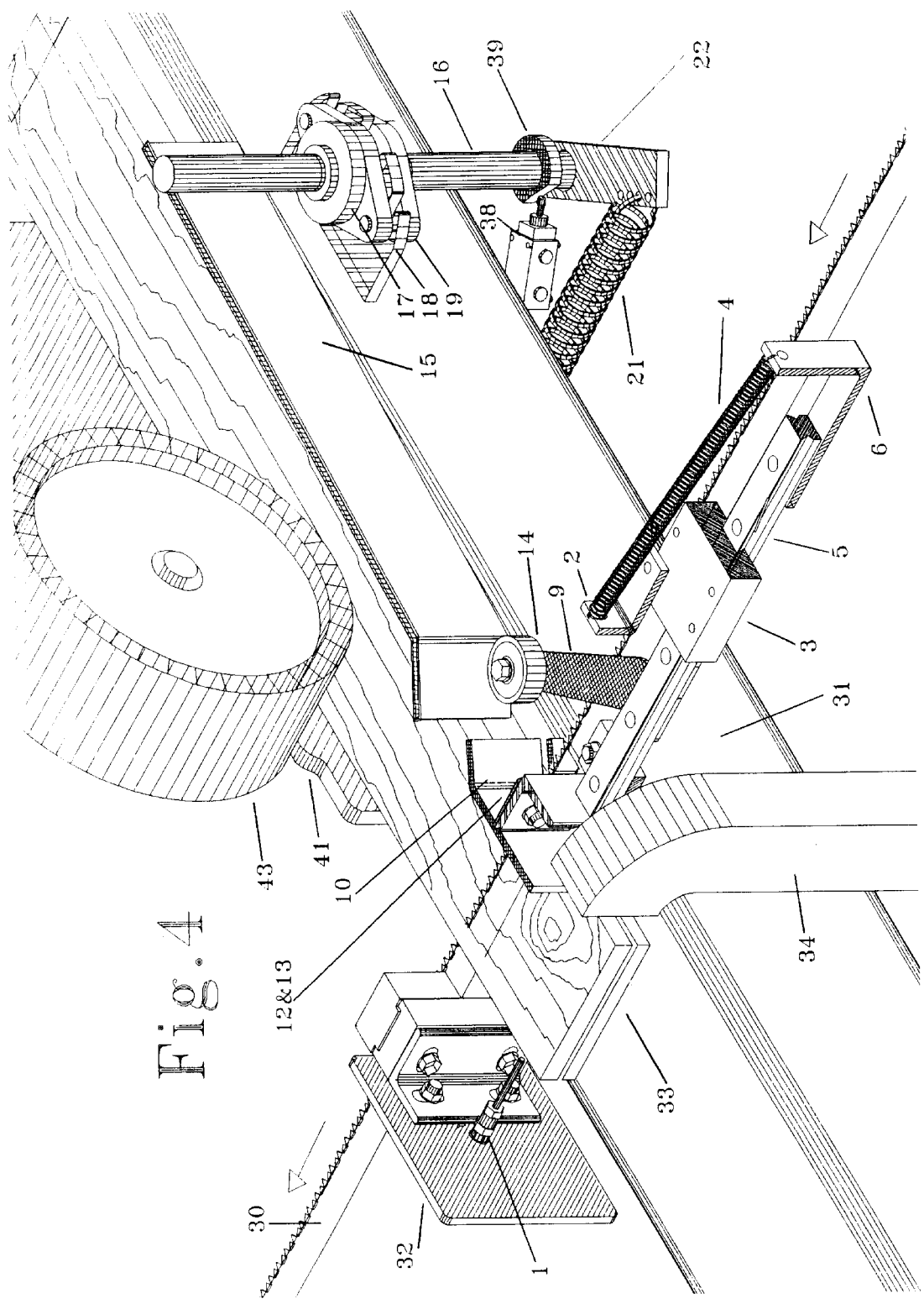
FIG. 4 shows an alternate embodiment of the present invention.

FIG. 4 shows an alternate embodiment of the present invention where the air discharge nozzle 1 is mounted on the standard fixed saw guide assembly 32, with the direction of air flow in the opposite the direction of the band saw band 30 travel. This doesn't work as well as the preferred embodiment of the invention shown in the FIGS. 1, 2, and 3. The auxiliary dust collector 34 is shown only on FIG. 4, but it is a part of the preferred embodiment of the present invention.

Although the description above contains many specificities, these should not be construed as limiting the scope of the invention but as merely providing illustrations of some of the presently preferred embodiments of this invention. For example, in the details, sawdust is removed from a board. However, the wood being sawed could as well been some other form, such as a chair leg, or a pressed wood shape. Also, the present invention is applicable to many materials other than wood, such as plastics and metals. Also, the direction of the air flow is shown in the direction of the blade cut, in the preferred embodiment described. If the air flow is in the opposite direction of the blade cut, it would not work as well, but it still would be an advance in the art of sawdust removal as compared to the present state of the art. The width positioning arm assembly 20 and the slide shoe assembly 10 working together to automatically adjust to the board widths is shown with a horizontal band saw blade. It is also applicable with a vertical band saw blade. The present invention includes an improved means of removing dust from sawing operations that is of primary interest for horizontal blade operations, however it also is applicable to vertical blade operations. Also, springs are referred to, however air cylinders or rubber bands could serve the same purpose, as obvious to anyone skilled in the state of the art. Thus the scope of the invention should be determined by the appended claims and their legal equivalents, rather than by the examples given.

I claim:

1. A device for automatically adjusting band saw blade guides according to widths of material being sawn by a band saw so as to minimize unsupported blade spans comprising a saw guide fixed to a band saw frame and a slide shoe assembly which includes a slide, a slide shoe mounted on the slide, at least one blade guide mounted on the slide, and a means of urging the slide shoe against the material being sawn, which in turn biases the material being sawn against a reference surface, wherein said slide shoe assembly is slideable within a mount that is a part of a band saw framework.

2. A device for removing dust from sawn material which consists of the device of claim 1 and an air discharge nozzle positioned with respect to the material width by mounting the air discharge nozzle on the slide shoe assembly wherein said air discharge nozzle directs a flow of air behind the band saw blade, parallel to the direction of travel of the band saw blade, through a cut in the material being sawn as the cut is being produced by the band saw blade, said air flow removing the dust from the material being sawn as it is sawn.

3. The device of claim 1 further comprising:
    a) a width positioning arm assembly comprised of a width positioning arm that abuts the material being sawed, said width positioning arm mounted on a shaft, said shaft mounted in bearings, said bearings mounted by way of a bracket to a band saw frame, and a means of urging the width positioning arm assembly against the material beings sawn, which in turns biases the material being sawn against the reference surface.

4. The device of claim 3 wherein the width positioning arm that abuts on the material being sawn is assisted in being urged against the material being sawn by a roller mounted on an arm extending from the slide shoe assembly, said roller engaging the width positioning arm.

5. The device of claim 3 wherein the means of turning on or off an air supply to the air discharge nozzle includes a cam mounted on the shaft of the width positioning arm assembly said cam operating a roller cam operated air supply valve.

6. The device for removing dust from sawn material of claim 2 further comprising means for supplying air flow to the air discharge nozzle as required, said means including an air supply valve and a cam mounted on the shaft of the width positioning arm assembly to actuate said valve.

* * * * *